United States Patent [19]

Fukuchi et al.

[11] Patent Number: 5,309,628

[45] Date of Patent: May 10, 1994

[54] ASSEMBLING POSITION ADJUSTING MECHANISM OF A SPINDLE MOTOR FOR A MAGNETIC DISK APPARATUS

[75] Inventors: Kiyoshi Fukuchi, Musashino; Yoshiaki Sakai, Higashikurume; Hiroshi Tsuyuguchi, Tokyo; Takashi Numata, Tokorozawa; Fumio Nagase, Tama, all of Japan

[73] Assignee: TEAC Corporation, Japan

[21] Appl. No.: 992,134

[22] Filed: Dec. 17, 1992

[30] Foreign Application Priority Data

Dec. 27, 1991 [JP] Japan .................. 3-107976[U]

[51] Int. Cl.$^5$ .............................................. B23P 19/04
[52] U.S. Cl. ............................. 29/759; 29/603; 29/737; 29/760; 29/DIG. 28
[58] Field of Search ................. 29/603, 721, 732, 737, 29/759, 760, DIG. 28; 360/103, 106

[56] References Cited

U.S. PATENT DOCUMENTS

| | | | |
|---|---|---|---|
| 4,509,251 | 4/1985 | Gyi et al. | 29/603 |
| 4,520,555 | 6/1985 | Gyi et al. | 29/760 X |
| 4,587,714 | 5/1986 | Morris | 29/603 X |
| 4,809,427 | 3/1989 | Suzuki et al. | 29/603 |
| 4,964,941 | 10/1990 | Von Brandt et al. | 29/759 X |

FOREIGN PATENT DOCUMENTS

| | | | |
|---|---|---|---|
| 228739 | 9/1989 | Japan | 29/721 |
| 2152730 | 6/1990 | Japan | 29/759 |

*Primary Examiner*—Peter Dungba Vo
*Attorney, Agent, or Firm*—Andrus, Sceales, Starke & Sawall

[57] ABSTRACT

An assembling position-adjusting mechanism of a magnetic disk apparatus able to adjust the azimuth, radial alignment, and index of a magnetic head by adjusting a position thereof during the assembling process of a spindle motor. A positioning head movable in a direction perpendicular to a top surface of a table is provided. A plurality of positioning pins are provided on the bottom of the positioning head. Moving mechanisms are provided in the positioning head so that the bottom surface of the positioning head is movable and rotatable parallel to the top surface of the table. Each positioning pin of the positioning head is inserted into a respective positioning hole of a motor assembly so as to move the motor assembly with a movement of the positioning head so that the spindle motor of the motor assembly is at an appropriate position relative to the magnetic head of the main body of the magnetic disk apparatus.

7 Claims, 5 Drawing Sheets

ROTATIONAL DIRECTION OF DISK

ASSEMBLING POSITION ADJUSTING MECHANISM OF A SPINDLE MOTOR FOR A MAGNETIC DISK APPARATUS

BACKGROUND OF THE INVENTION

The present invention generally relates to an assembling position-adjusting mechanism of a spindle motor for a magnetic disk apparatus, and more particularly to an assembling position-adjusting mechanism of a spindle motor for a magnetic disk apparatus which mechanism is advantageously used for adjusting a position of a spindle motor with respect to a magnetic head during assembling process.

FIG. 1 is a perspective view showing an entire part of a magnetic disk apparatus 1 (hereinafter called apparatus 1) for 3.5-inch disks which apparatus is related to the present invention. A magnetic head 2, a head carriage 3 that supports and moves the magnetic head 2, and a spindle motor 4 that clamps and rotates a magnetic disk are assembled in the apparatus 1.

Generally, in a magnetic disk apparatus for 3.5-inch disks, since a high accuracy is required for a positional relationship between a magnetic head and tracks formed on a magnetic disk, a mechanism is needed for adjusting the positional relationship during an assembling process.

FIG. 2 shows a positional relationship between the magnetic head 2 and a track 6 formed on the magnetic disk loaded on the spindle motor 4 of FIG. 1. The magnetic head 2 overlaps over the entire width of the track 6 and the center line of the magnetic head 2 (a line perpendicular to the length of the magnetic head 2, as shown in FIG. 2) is positioned at an angle $\theta$ from a radius line 7 of the magnetic disk (i.e. radius line of the spindle motor 4).

In order to adjust this positional relationship, three kinds of position adjustments are needed. That are azimuth alignment adjustments for an angle of a head gap on the magnetic head 2 with respect to the track (adjustment of $\theta$ of FIG. 2), radial alignment adjustments for a position of the magnetic head 2 in a radial direction (adjustment in a direction indicated by an arrow Y of FIG. 2), and index adjustments for a position of the magnetic head 2 with respect to an index-pulse position (adjustment in a direction indicated by an arrow X of FIG. 2).

Firstly, a description will be given of the azimuth alignment with reference to FIG. 3. FIG. 3 is a plan view of a conventional azimuth adjusting mechanism. The head carriage 3, on which the magnetic head 2 is mounted, is slidably supported by a guide rod 8, and one end of the head carriage 3 is engaged with a lead screw 10 extending from a stepping motor 11 so that the head carriage 3b moves along the guide rod 8 by rotation of the lead screw 10.

In the azimuth adjusting mechanism in the figure, the azimuth of the magnetic head 2 is adjusted by inclining the head carriage 3 (for example as shown by a chain line in FIG. 3) from the center line 7 of the spindle motor not shown in the figure. This can be done by displacing a movable end 8a of the guide rod 8 about a fixed end 8b of the guide rod 8b in a direction indicated by an arrow A of FIG. 3 by screwing a taper screw 9.

The radial alignment adjustment is performed by adjusting a mounting angle of the stepping motor 11 in a rotational direction of the lead screw 10. The magnetic head 2 moves in the radial direction of the spindle motor in accordance with a rotation of the lead screw formed on the rotational shaft of the stepping motor 11. The stopping position of the magnetic head 2 is determined by the stopping position of the lead screw 10 in the rotational direction. Thus, the stopping position of the head carriage 2 in the radial direction is adjusted by adjusting the mounting position of the stepping motor 11, which results in adjusting the position of the lead screw 10 in the rotational direction thereof.

Conventionally, the index adjustment is performed by adjusting an index-pulse generating means inside the spindle motor. Namely, a positional relationship between the magnetic head 2 and the index pulse generating point is adjusted by shifting a generating time of an index pulse.

However, in the above mentioned azimuth adjustment mechanism, a space for providing the taper screw 9 is limited. Additionally, since the guide rod 8 is thin, there is a problem in that the guide rod 8 bends when a large displacement is effected to the guide shaft 8. Further, when a tolerance of parts comprising a head carriage driving mechanism goes to the worst condition, there is a risk that the flap 12 makes contact with the photo-interrupter provided for detecting the track 00 of the magnetic disk.

Additionally, the radial alignment adjustment and the index adjustment must be performed separately; this results in time- and labor-consuming adjustments.

SUMMARY OF THE INVENTION

It is a general object of the present invention to provide a novel and useful assembling position-adjusting mechanism of a spindle motor for a magnetic disk apparatus.

A more specific object of the present invention is to provide an assembling position-adjusting mechanism by which a position of a magnetic head relative to a spindle motor onto which a magnetic disk is loaded, is adjusted when assembling the spindle motor into a magnetic disk apparatus.

In order to achieve the above mentioned object, an assembling position-adjusting mechanism of a spindle motor according to the present invention comprises:

a table having a top surface on which a main body of a magnetic disk apparatus including a magnetic head is fixed;

a positioning head having a bottom surface holding a motor assembly including a spindle motor that is assembled in the main body of the magnetic apparatus, the bottom surface having engaging means for engaging with the motor assembly so that the motor assembly is moved to a predetermined position with a movement of the positioning head;

a first moving means for moving the positioning head in a direction perpendicular to the top surface of the table; and a second moving means, provided in the positioning head, for moving the bottom surface of the positioning head so that the bottom surface of the positioning head moves parallel to the top surface of the table, the main body of the magnetic disk apparatus being fixed on the top surface of the table and the motor assembly that is engaged with the bottom surface of the positioning head, and the motor assembly being placed on the main body when assembling the motor assembly to the main body of the magnetic disk apparatus, the motor assembly being moved by operating the second moving means of the positioning head so as to adjust a position of the motor assembly so that the magnetic head of the main body of the magnetic disk apparatus is at a predetermined position relative to the spindle motor of the motor assembly.

By using the assembly adjusting jig according to the present invention, the azimuth of the magnetic head is appropriately adjusted by adjusting a position of the motor assembly when assembling the motor assembly with the main body without providing a special part for adjusting the azimuth. Thus, the number of parts of the magnetic disk apparatus and a process for machining the parts used for azimuth adjustment are reduced, and thus the manufacturing costs of the magnetic disk apparatus are reduced.

Further, the radial alignment adjustment and the index adjustment can be performed in the same process where the azimuth adjustment is performed, thus those adjustments previously performed in separate process can be performed in one process resulting in simplification of the manufacturing process of the magnetic disk apparatus.

Other objects, features and advantages of the present invention will become more apparent from the following detailed description when read in conjunction with the accompanying drawings.

DETAILED DESCRIPTION OF THE PREFERRED EMBODIMENT

Figure 1:
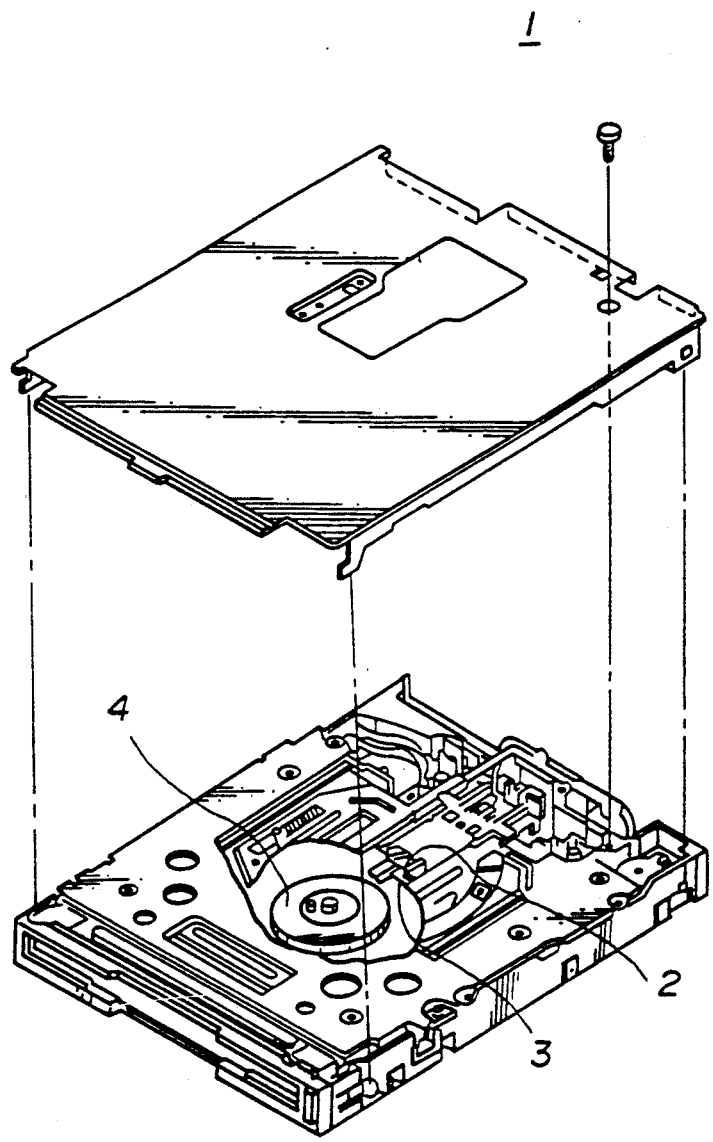
FIG. 1 is a perspective view of an entire part of a magnetic disk apparatus using a 3.5-inch disk.
Figure 2:
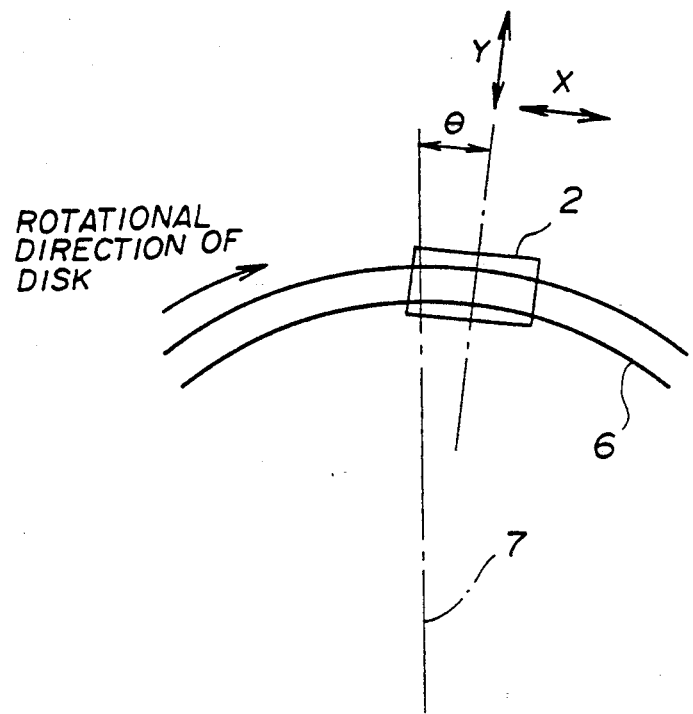
FIG. 2 shows a positional relationship between a head carriage and a track on a magnetic disk.
Figure 3:
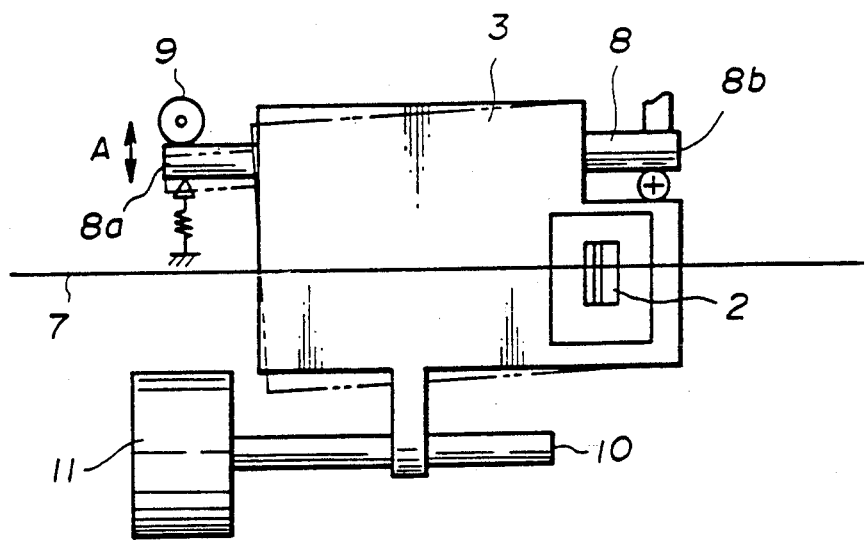
FIG. 3 is a plan view of a conventional head carriage driving mechanism.
Figure 4:
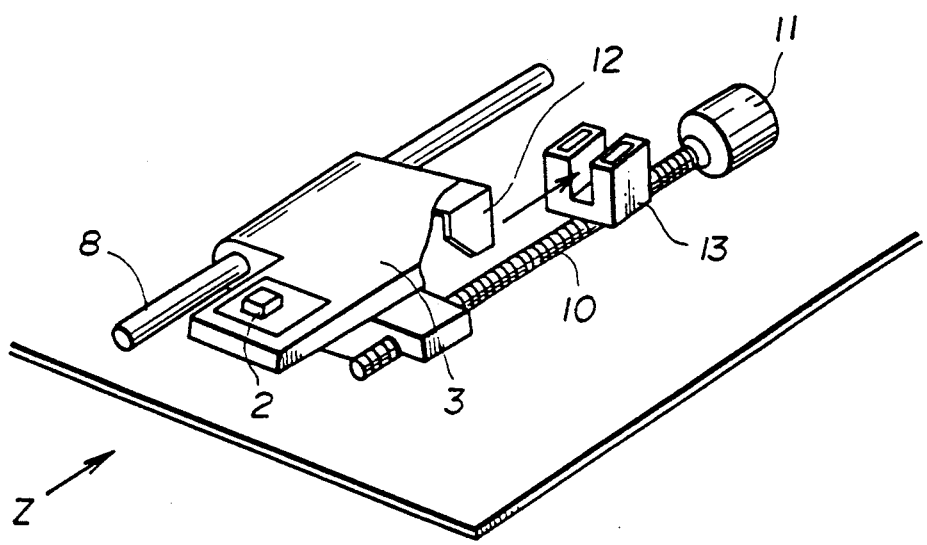
FIG. 4 is a perspective view for explaining a flap and a photo-interrupter.
Figure 5:
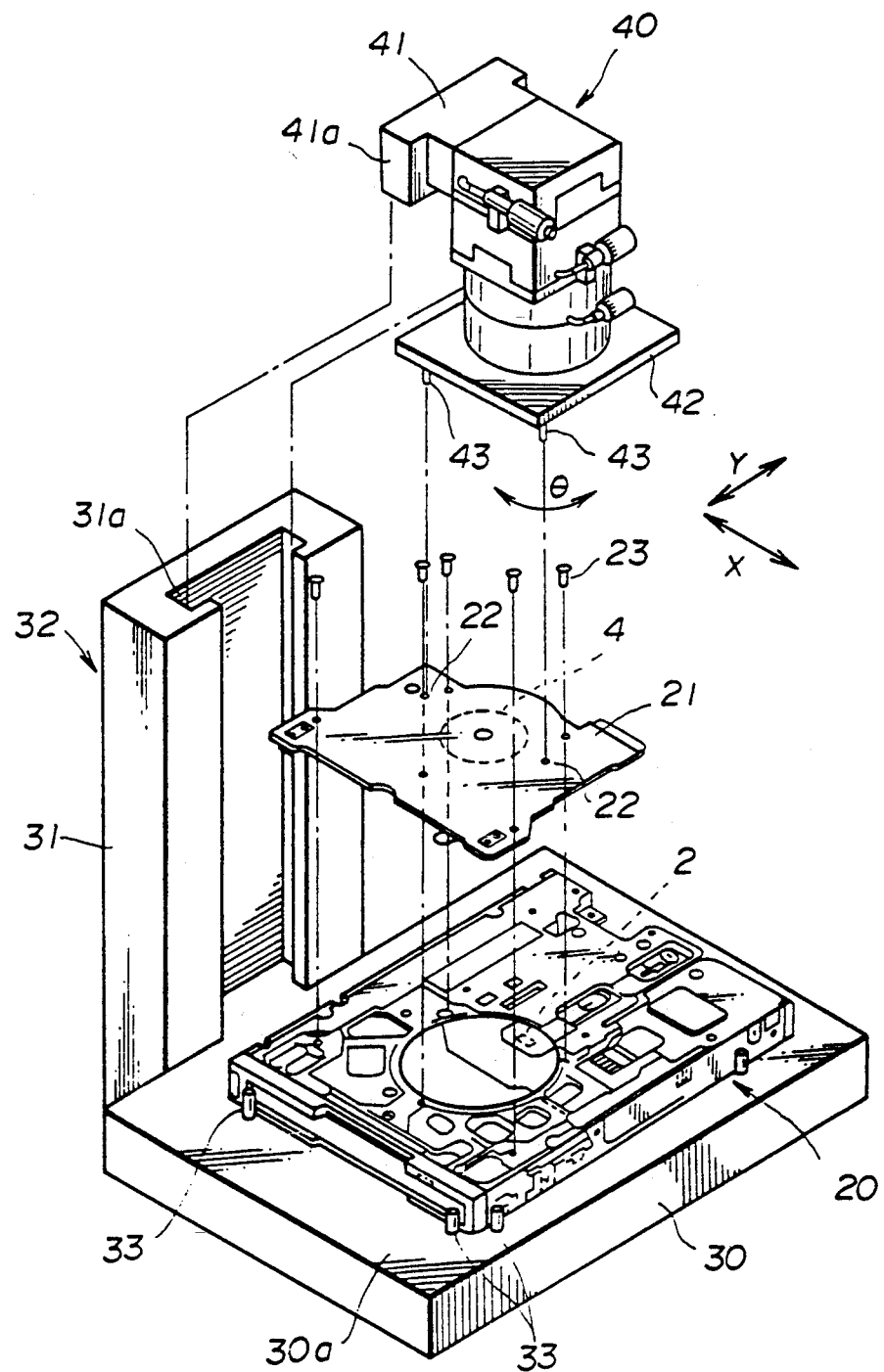
FIG. 5 is a perspective view of an example of an assembling position-adjusting mechanism according to the present invention.

A description will now be given, with reference to FIG. 5, of an assembling position-adjusting mechanism of a spindle motor for a magnetic disk apparatus. FIG. 5 is a perspective view of an example of an assembling position-adjusting mechanism according to the present invention.

An assembly adjusting jig 32 comprises a table 30 onto which a main body of a magnetic disk apparatus 20 is placed and fixed, a positioning head 40, and a support column 31 provided for moving the positioning head 40 in a direction perpendicular to a top surface 30a of the table 30.

Both extended sides 41a of a mounting base 41 of the positioning head 40 are engaged with grooves 31a provided on the support column 31, and thus the positioning head 40 is movable in a direction perpendicular to the top surface 30a of the table 30 by means of a moving mechanism not shown in the figure.

There is provided a bottom plate 42, parallel to the top surface 30a of the table 30, on the bottom of the positioning head 40. Two positioning pins 43 are fixed on the bottom plate 42 in a state where the pins 43 extend toward the top surface 30a of the table 30. The pins 43 are formed and positioned so that each pin 43 fit into respective positioning hole 22 formed on a motor assembly 21 in which the spindle motor 4 is assembled.

The bottom plate 42 is provided with a moving mechanism that allows the bottom plate to move in directions indicated by arrows X and Y, which are parallel to the top surface of the table 30, and to rotate in a direction indicated by an arrow $\theta$ (explained in the following). The movement preformed by means of the moving mechanism is for fine adjustment, and thus the movement can be very small.

Figure 6:
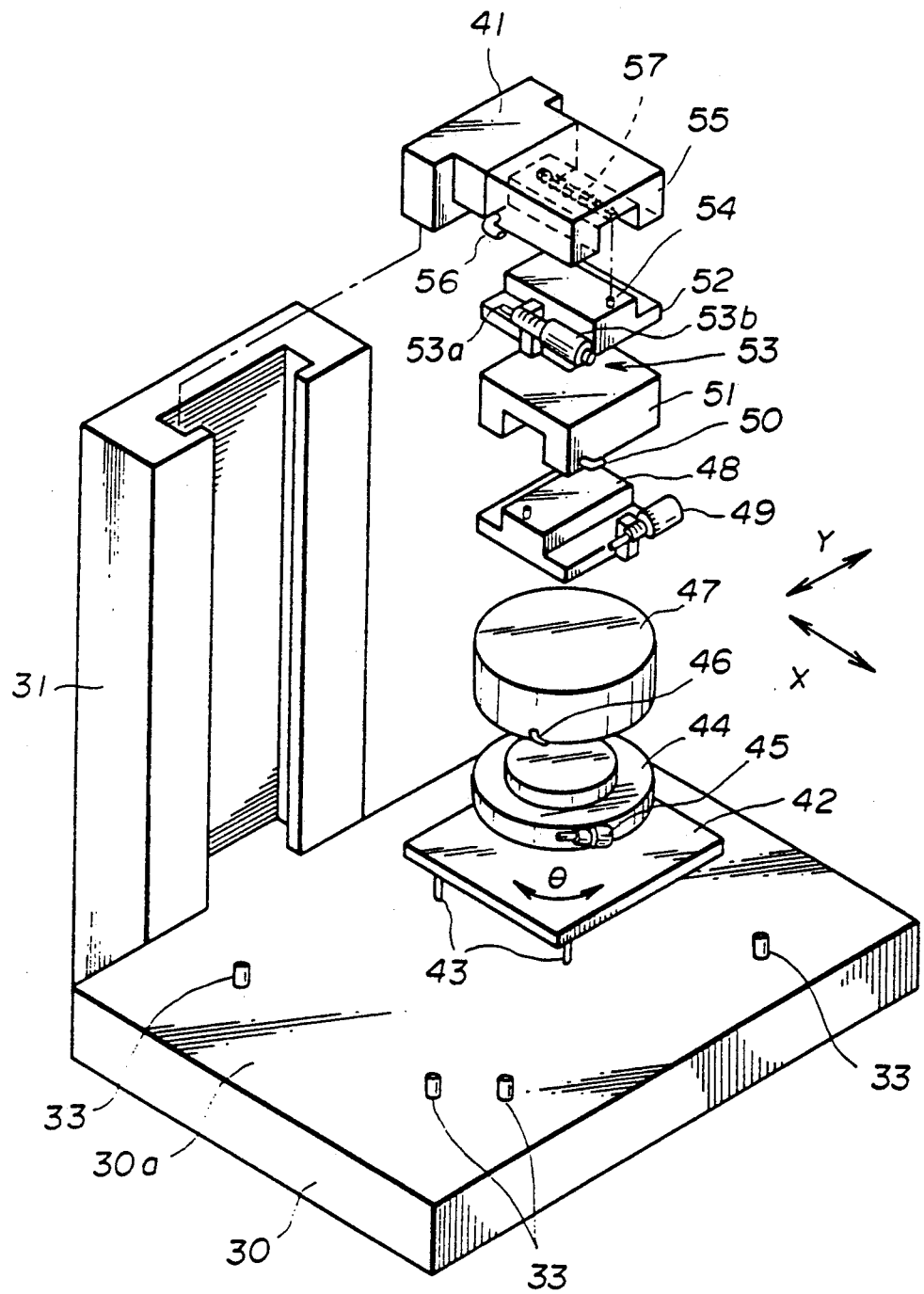
FIG. 6 is an exploded view of the assembly adjusting jig shown in FIG. 5.

Next, a description will be made, with reference to FIG. 6, of the moving mechanism of the bottom plate 42 provided to the positioning head 40. FIG. 6 is an exploded view of an assembly adjusting jig 32. A slide plate mounting base 55 is fixed to the mounting base 41 moving along the supporting column 31 in a direction perpendicular to the top surface 30a of the table 30. A slide plate 52 is slidably provided on the bottom of the mounting base 55 as a portion of the slide plate 52 fits to a groove formed on the bottom of the mounting base 55. A spindle 53 is provided on a side of the slide plate 52 and an end of a pressing rod 53a of the spindle 53 makes contact with a pin 56, bent so as to extend toward the end of the pressing rod 53a, fixed on the side of the mounting base 55. The spindle 53 has a knob 53b engaged with the pressing rod 53a by means of screw so that the pressing rod 53a is made to move in the axial direction by rotating the knob 53b. This moving mechanism of the spindle 53 is similar to that in a conventional micrometer, which performs a precise measurement of a dimension. The pin 56 is pressed by the pressing rod 53a as the pressing rod 53a moves, and thus the slide plate 52 moves relative to the mounting base 55. Additionally, a spring 57 is provided inside the groove of the mounting base 55, and one end of the spring 57 is fixed to the mounting base 55, and the other end of the spring 57 is engaged with a pin 54 provided on the slide plate 52 so that the spring 57 is positioned along a moving direction of the slide plate 52. Due to a resilient force generated by the spring 57, the end of the pressing rod 53a of the spindle 53 always makes contact with the end of the pin 56.

On the bottom of the slide plate 52, a slide plate mounting base 51 is mounted, and similarly to the above mentioned structure, a slide plate 48, a spindle 49, and a pin 50 are provided.

The above two similar slide plates 52 and 48 are arranged so that the slide plates 52 and 48 move in directions perpendicular to each other. That is, the slide plate 52 moves in the direction indicated by an arrow X of FIG. 6 and the slide plate 48 moves in the direction indicated by an arrow Y of FIG. 6.

Further, a rotation plate mounting base 47 is mounted on the bottom of the slide plate 48, and a rotation plate 44 is rotatably mounted on the bottom of the mounting base 47 in a direction indicated by an arrow $\theta$ of FIG. 6. Similarly to the above mentioned moving mechanism, the rotation plate rotates by means of a pin 46 fixed on the mounting base 47 and a spindle 45 mounted on the rotation plate 44. the bottom plate 42 having the two positioning pins 43 is fixed on the bottom of the rotation plate 44.

The assembly adjusting jig 32 has a structure as mentioned above, and thus the bottom plate 42 is movable in the directions indicated by the arrows X, Y, and $\theta$ by operating the spindles 53, 49, and 45.

Next, a description will be given, with reference to FIG. 5, of an assembling operation of the motor assembly 21 to the main body 20 of the magnetic disk apparatus.

The main body 20 of the magnetic disk apparatus has been assembled with all the components except the motor assembly 21. The main body 20 is placed on the top surface of the table 30 with a face (this face is a bottom face of the apparatus) onto which the motor assembly 21 is assembled, and held by pins 33, fixed to the top surface of the table 30 at the sides, so that the main body 20 is fixed on the top surface 30a.

The motor assembly 21, assembled with the spindle motor 4 that rotates a magnetic disk, is attached to the bottom plate 42, and the positioning head 40 is moved downwardly until the motor assembly 21 is positioned in a predetermined place on the main body 20 in a state where each of positioning pins 43 of the positioning head are inserted into respective positioning holes 22.

After that, a display apparatus not shown in the figure is connected to the main body 20. This display apparatus displays a signal supplied from the main body 20 that is placed on the assembly adjusting jig 32 with the motor assembly 21 assembled in the main body 20. Additionally, a magnetic disk used for the adjusting operation is loaded to the main body 20 on the assembly adjusting jig 32. Since the motor assembly 21 is appropriately pressed by the positioning head 32, the position of the motor assembly 21 relative to the main body 20 is not allowed to change.

Following the above mentioned operation, the assembly comprising the main body 20 and the motor assembly 21 is operated in order to obtain signals from the assembly. The motor assembly 21 is moved to the most appropriate position by operating the moving mechanism of the positioning head 40 in order to move the bottom plate 42 while observing a change of the signals displayed on the displaying apparatus.

As mentioned above, the position of the motor assembly 21 relative to the main body 20 in which the magnetic head 2 is provided is adjusted so that the magnetic head 2 is at the most appropriate position with respect to the magnetic head loaded on the spindle motor 4 of the motor assembly 21. Namely, the azimuth adjustment, the radial alignment adjustment, and the index adjustment are performed in one process by having the magnetic head 2 relative to the spindle motor 4 be at the most appropriate position.

After confirming that the motor assembly 21 has been placed at the most appropriate position by checking the signal displayed on the displaying apparatus, the motor assembly 21 is permanently fixed to the main body 20 by using screws 23.

As mentioned above, by using the assembly adjusting jig of this embodiment, the azimuth of the magnetic head is appropriately adjusted by adjusting a position of the motor assembly when assembling the motor assembly to the main body without providing special parts for adjusting the azimuth. Thus, the number of parts of the magnetic disk apparatus and a process for machining the parts used for azimuth adjustment are reduced, and thus the manufacturing costs of the magnetic disk apparatus are reduced.

Further, by using the assembly adjusting jig of this embodiment, the radial alignment adjustment and the index adjustment can be performed in the same process that the azimuth adjustment is performed, thus those adjustments previously performed in separate processes can be performed in one process thus resulting in simplification of the manufacturing process of the magnetic disk apparatus.

The present invention is not limited to the specifically disclosed embodiments, and variations and modifications may be made without departing from the scope of the present invention.

What is claimed is:

1. An assembling position-adjusting mechanism of a spindle motor for a magnetic disk apparatus comprising:
   a table having a top surface on which a main body of a magnetic disk apparatus including a magnetic head is fixed;
   a positioning head having a bottom surface holding a motor assembly including a spindle motor assembled in said main body of said magnetic apparatus, said bottom surface having engaging means for engaging with said motor assembly to move said motor assembly with a movement of said positioning head to a predetermined position;
   a first moving means for moving said positioning head in a direction perpendicular to said top surface of said table; and
   a second moving means, provided in said positioning head, for moving said bottom surface of said positioning head so that said bottom surface of said positioning head moves in a direction parallel to said top surface of said table.
   said main body of said magnetic disk apparatus being fixed on said top surface of said table, and said motor assembly being engaged with said bottom surface of said positioning head and being placed on said main body when assembling said motor assembly to said main body of said magnetic disk apparatus, said motor assembly being moved by operating said second moving means of said positioning head to adjust a position of said motor assembly so that said magnetic head of said main body of said magnetic disk apparatus is at a predetermined position relative to said spindle motor of said motor assembly.

2. The assembling position-adjusting mechanism as claimed in claim 1, wherein said second moving means comprises:
   a first moving mechanism moving said bottom surface of said positioning head in a predetermined direction parallel to said top surface of said table;
   a second moving mechanism moving said bottom surface of said positioning head in a direction parallel to said top surface of said table and perpendicular to said predetermined direction; and
   a third moving mechanism rotating said bottom surface of said positioning head in a direction parallel to said top surface of said table.

3. The assembling position-adjusting mechanism as claimed in claim 1, wherein said engaging means of said positioning head comprises a plurality of pins provided on said bottom surface of said positioning head, said pins protruding perpendicular to said top surface of said table, said motor assembly moving with a movement of said positioning head while each of said pins is inserted into a respective hole formed in said motor assembly.

4. The assembling position-adjusting mechanism as claimed in claim 2, wherein said first moving mechanism comprises a stationary part having a protrusion protruding outwardly from said stationary part; a movable part slidably mounted on said stationary part; and a spindle shaft, provided to said movable part, reciprocating by means of a screw mechanism, and end of said spindle shaft being engaged with said protrusion.

5. The assembling position-adjusting mechanism as claimed in claim 2, wherein said second moving mechanism comprises a stationary part having a protrusion protruding outwardly from said stationary part; a movable part slidably mounted on said stationary part; and a spindle shaft, provided to said movable part, reciprocating by means of a screw mechanism, and end of said spindle shaft being engaged with said protrusion.

6. The assembling position-adjusting mechanism as claimed in claim 2, wherein said third moving mechanism comprises a stationary part having a protrusion protruding outwardly from said stationary part; a movable part rotatably mounted on said stationary part; and a spindle shaft, provided to said movable part, reciprocating by means of a screw mechanism, an end of said spindle shaft being engaged with said protrusion.

7. The assembling position-adjusting mechanism as claimed in claim 2, wherein:

said first moving mechanism comprises a first stationary part having a first protrusion protruding outwardly from said first stationary part, a first movable part slidably mounted on said first stationary part, and a first spindle shaft, provided to said first movable part, reciprocating by means of a screw mechanism, and end of said first spindle shaft being engaged with said first protrusion;

said second moving mechanism comprises a second stationary part having a second protrusion protruding outwardly from said second stationary part and being fixed on said first movable part, a second movable part slidably mounted on said second stationary part, and a second spindle shaft, provided to said second movable part, reciprocating by means of a screw mechanism, an end of said second spindle shaft being engaged with said second protrusion; and said third moving mechanism comprises a third stationary part having a third protrusion protruding outwardly from said third stationary part and being fixed on said second movable part, a third movable part rotatably mounted on said third stationary part, and a third spindle shaft, provided to said third movable part, reciprocating by means of a screw mechanism, and an end of said third spindle shaft being engaged with said third protrusion, and wherein said bottom surface of said positioning head comprises a bottom surface of said third movable part.

* * * * *